US012759183B2

(12) United States Patent
Charback

(10) Patent No.: US 12,759,183 B2
(45) Date of Patent: Oct. 13, 2026

(54) TRIM BOARD CUTTING JIG ASSEMBLY AND METHODS OF USING THE SAME

(71) Applicant: Michael J. Charback, New Albany, OH (US)

(72) Inventor: Michael J. Charback, New Albany, OH (US)

( * ) Notice: Subject to any disclaimer, the term of this patent is extended or adjusted under 35 U.S.C. 154(b) by 332 days.

(21) Appl. No.: 18/601,675

(22) Filed: Mar. 11, 2024

(65) Prior Publication Data

US 2025/0282077 A1 Sep. 11, 2025

(51) Int. Cl.
*B27B 27/02* (2006.01)
*B27D 5/00* (2006.01)
*B27G 5/00* (2006.01)

(52) U.S. Cl.
CPC .................................... *B27B 27/02* (2013.01)

(58) Field of Classification Search
CPC .......... B27B 27/02; B27D 5/006; B27G 5/00; B23Q 9/0007
See application file for complete search history.

(56) References Cited

U.S. PATENT DOCUMENTS

| | | | | |
|---|---|---|---|---|
| 363,016 A * | 5/1887 | Stalter | B27B 27/02 83/446 |
| 4,262,571 A | 4/1981 | King et al. | |
| 4,848,203 A * | 7/1989 | Brooks | B27B 27/02 83/438 |
| 5,699,711 A | 12/1997 | Gold | |
| 6,240,822 B1 * | 6/2001 | Musser | B27B 27/02 144/287 |
| 6,305,091 B1 | 10/2001 | Tegels | |
| 8,950,307 B1 * | 2/2015 | Harlos | B27B 11/04 83/762 |
| 2008/0250905 A1 | 10/2008 | Khan | |
| 2015/0183123 A1 * | 7/2015 | Niichel | B23D 59/00 83/418 |
| 2021/0299768 A1 * | 9/2021 | Wang | B25H 1/08 |

FOREIGN PATENT DOCUMENTS

| | | | |
|---|---|---|---|
| CA | 2832314 | C | 7/2014 |
| IT | 201800004486 | A1 | 10/2019 |
| WO | 1983002917 | A1 | 9/1983 |
| WO | 2009153602 | A1 | 12/2009 |

OTHER PUBLICATIONS

Luthiery Laboratories, Fret Slotting Jig (1/3), [retrieved on Mar. 27, 2024]. Retrieved from the Internet <https://luthierylabs.com/laboratory/templates-jigs/fret-slotting-jig/>.

* cited by examiner

*Primary Examiner* — Mohammed S. Alawadi

(57) ABSTRACT

A reversible jig assembly for removing and replacing a portion of a trim board affixed to a substrate, comprising a first guide coupled to a first jig member; a second guide coupled to a second jig member, wherein the first guide and the second guide define a cutting channel for receiving a cutting blade, and wherein the first jig member and the second jig member are configured to define a first contact surface opposite a second contact surface; a first alignment rail extending a predetermined distance above and perpendicular to the first contact surface; and a second alignment rail extending a predetermined distance above and perpendicular to the second contact surface.

12 Claims, 7 Drawing Sheets

TRIM BOARD CUTTING JIG ASSEMBLY AND METHODS OF USING THE SAME

BACKGROUND

The described apparatus relates in general to cutting tools and accessories used in basic carpentry and more specifically to a trim cutting jig assembly for removing a predetermined portion of a trim board from a structure without having to remove the entire, full-length trim board from the structure.

Trim pieces and trim boards are typically installed on homes or other buildings to provide aesthetic appeal and to conceal intersections of walls and other surfaces. Exterior trim is often installed in the form of long, uniform boards that are mounted at various intersection points along the periphery of homes, adjacent to vinyl or other siding material. As with all exterior surfaces, trim boards often become damaged from weather or for other reasons and need to be removed or repaired. The use of conventional tools, such as hand saws or miter saws, to remove a portion of a trim board that is still attached to a structure typically results in damage to existing siding and to non-damaged trim. Imprecise cuts and injury to the user may also result from the use of such tools. Commercially available jigs and cutting devices typically require an entire trim board to be removed from a structure before making a desired cut in the trim board. If only a portion of a trim board is damaged, cost benefits and increased convenience could be realized by removing and replacing only the damaged portion without removing and replacing the entire trim board. Accordingly, there is an ongoing need for a trim cutting jig assembly that can be used to quickly and effectively remove only the portion of a trim board needing repair without having to completely remove the entire trim board from a structure.

SUMMARY

The following provides a summary of certain example implementations of the disclosed technology. This summary is not an extensive overview and is not intended to identify key or critical aspects or elements of the disclosed technology or to delineate its scope. However, it is to be understood that the use of indefinite articles in the language used to describe and claim the disclosed technology is not intended in any way to limit the described technology. Rather the use of “a” or “an” should be interpreted to mean “at least one” or “one or more”.

A first embodiment of the disclosed technology provides a jig assembly, comprising a first guide coupled to a first jig member; a second guide coupled to a second jig member, wherein the first guide and the second guide are configured to define a channel, and wherein the first jig member and the second jig member are configured to define a first contact surface opposite a second contact surface; and a first alignment rail extending a predetermined distance above and perpendicular to the first contact surface. Some implementations of the jig assembly further comprise a second alignment rail extending a predetermined distance above and perpendicular the second contact surface. In various implementations, the channel is a through-cut channel adapted to receive the blade of a cutting device. In various implementations, the first and second guides define a channel having a predetermined cutting angle, wherein the predetermined cutting angle is oriented upward at 30 degrees. In various implementations, the first alignment rail and the second alignment rail each include a plurality of recessed attachment devices that couple the first alignment rail and the second alignment rail to the first jig member and the second jig member respectively. Some implementations of the jig assembly further comprise a plurality of mounting holes formed in the first and second contact surfaces, wherein each mounting hole in the plurality of mounting holes is adapted to receive a mounting screw for attaching the jig assembly to a surface. In various implementations, the jig assembly is reversible such that the first contact surface and the second contact surface can each engage a portion of a trim board affixed to a substrate; and the predetermined cutting angle of the channel is maintained upward at 30 degrees. In various implementations, the jig assembly is operative to remove and replace the portion of a trim board while the trim board remains affixed to the substrate.

A second embodiment of the disclosed technology provides a reversible jig assembly for removing and replacing a portion of a trim board affixed to a substrate, comprising a first guide coupled to a first jig member; a second guide coupled to a second jig member, wherein the first guide and the second guide are configured to define a through-cut channel that receives a blade, and wherein the first jig member and the second jig member are configured to define a first contact surface opposite a second contact surface; a first alignment rail extending a predetermined distance above and perpendicular to the first contact surface; and a second alignment rail extending a predetermined distance above and perpendicular the second contact surface. In various implementations, the first and second guides define a through-cut channel having a predetermined cutting angle, wherein the predetermined cutting angle is oriented upward at 30 degrees relative to the trim board, and wherein the predetermined cutting angle of the through-cut channel is maintained upward at 30 degrees when the jig assembly is reversed. In various implementations, the first alignment rail and the second alignment rail each include a plurality of recessed attachment devices that couple the first alignment rail and the second alignment rail to the first jig member and the second jig member respectively.

A third embodiment of the disclosed technology provides a method for repairing a portion of a board, comprising mounting a reversible jig assembly at a predetermined location on a first board affixed to a structure, wherein the jig assembly includes a first guide coupled to a first jig member; and a second guide coupled to a second jig member, wherein the first guide and the second guide are configured to define a cutting channel; placing a blade in the cutting channel and making a cut through the first board; and removing a portion of the first board corresponding to the cut. Implementations of this method further comprise mounting the reversible jig assembly to a second board having dimensions that correspond to the removed section of the first board; placing the blade in the channel and making a cut through the second board, wherein the angle of the cut in the second board corresponds to the angle of the cut made in the first board; and replacing the removed portion of the first board with the cut portion of the second board and affixing the second board to the structure. In various implementations, the first and second guides define a channel having a predetermined cutting angle, wherein the predetermined cutting angle is oriented upward at 30 degrees relative to the first board, and wherein the predetermined cutting angle of the channel is maintained upward at 30 degrees when the jig assembly is reversed. In various implementations, the first jig member and the second jig member define a first contact surface opposite a second contact surface. In various implementations, the reversible jig assembly further comprises a first alignment rail coupled to the first jig member and the second jig member, the first alignment rail extending a predetermined distance above and perpendicular to the first contact surface; and a second alignment rail coupled to the first jig member and the second jig member, the second alignment rail extending a predetermined distance above and perpendicular to the second contact surface. In various implementations, the first alignment rail and the second alignment rail each include a plurality of recessed attachment devices that couple the first alignment rail and the second alignment rail to the first jig member and the second jig member respectively.

It should be appreciated that all combinations of the foregoing concepts and additional concepts discussed in greater detail below (provided such concepts are not mutually inconsistent) are contemplated as being part of the technology disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed technology and, together with the general description given above and detailed description given below, serve to explain the principles of the disclosed subject matter, and wherein.

DETAILED DESCRIPTION

Figure 1:
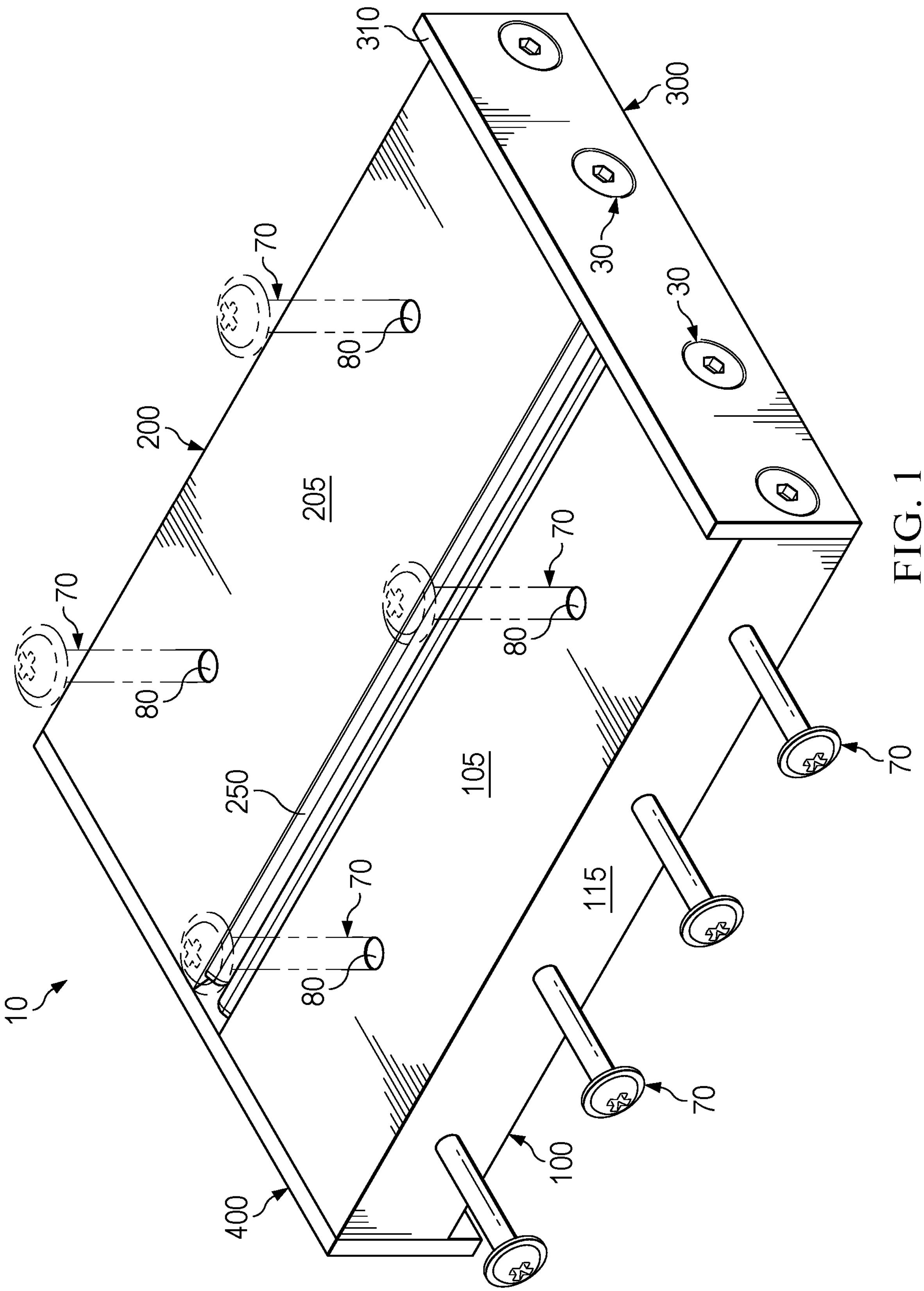
FIG. 1 is a first perspective view of an example implementation of the disclosed trim cutting jig assembly.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed technology. Accordingly, the following implementations are set forth without any loss of generality to, and without imposing limitations upon, the claimed subject matter.

The examples discussed herein are examples only and are provided to assist in the explanation of the apparatuses, devices, systems, and methods described herein. None of the features or components shown in the drawings or discussed below should be taken as required for any specific implementation of any of these the apparatuses, devices, systems or methods unless specifically designated as such. For ease of reading and clarity, certain components, modules, or methods may be described solely in connection with a specific Figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Example implementations of the disclosed systems, devices, and methods provide a trim cutting device or trim cutting jig assembly for removing a portion of a trim board or other board affixed to a structure or substrate, such as a home or building, without having to completely remove and replace the full trim board. The disclosed trim cutting device is reversible to maintain an upward, 30 degree cutting angle relative to the trim board/substrate, thereby channeling water away from the cut and mitigating water instruction, while also preventing damage to existing siding and trim during cutting. As discussed herein: (i) the trim cutting device can be mounted to an existing board already affixed to a structure; (ii) a multi-tool or similar tool having a blade can engage the trim cutting device at an upward cutting angle and make a consistent, uniform cut along the board at a predetermined location; and (iii) when the trim cutting device is unmounted, the cut portion of the board can be removed. The disclosed trim cutting device can thereafter be attached to a new, independent replacement board having the same dimensions as the removed board portion to obtain a corresponding cut. The replacement board can then be nailed to the existing board affixed to a structure, and all remaining holes can be caulked.

Figure 2:
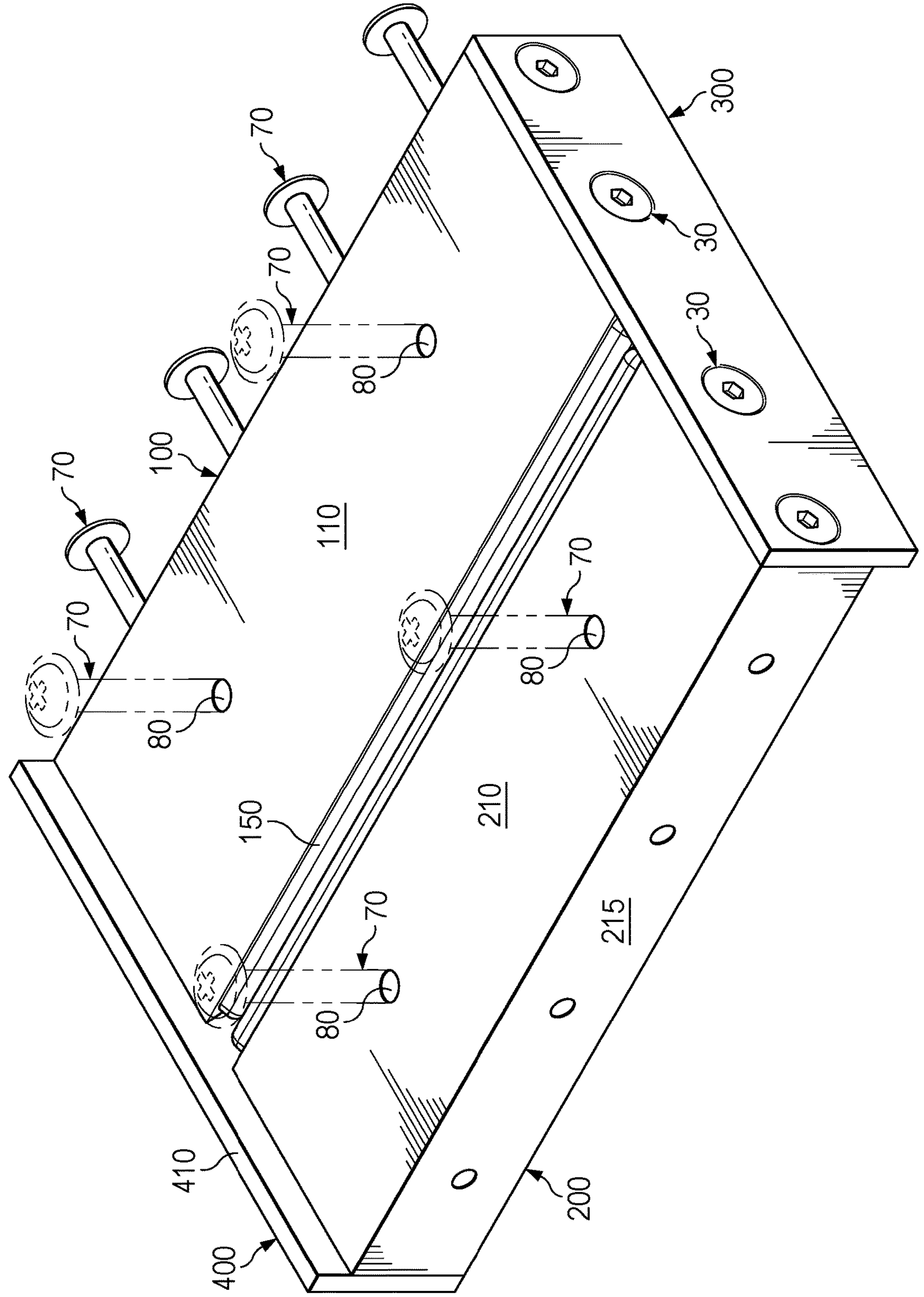
FIG. 2 is an alternate perspective view of the trim cutting jig assembly of FIG. 1.
Figure 3:
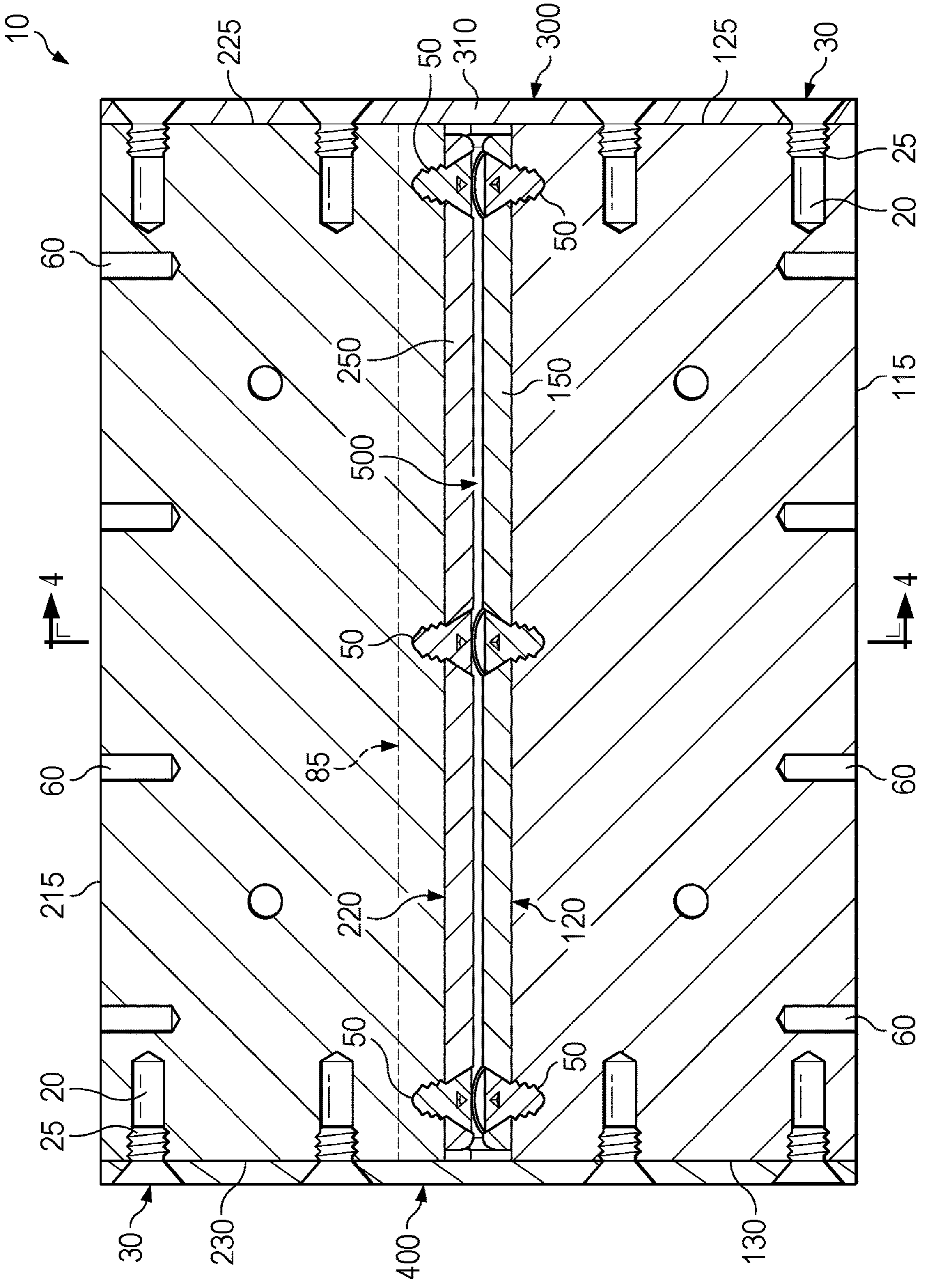
FIG. 3 is a cross-sectional, top down view of the trim cutting jig assembly of FIG. 1.
Figure 4:
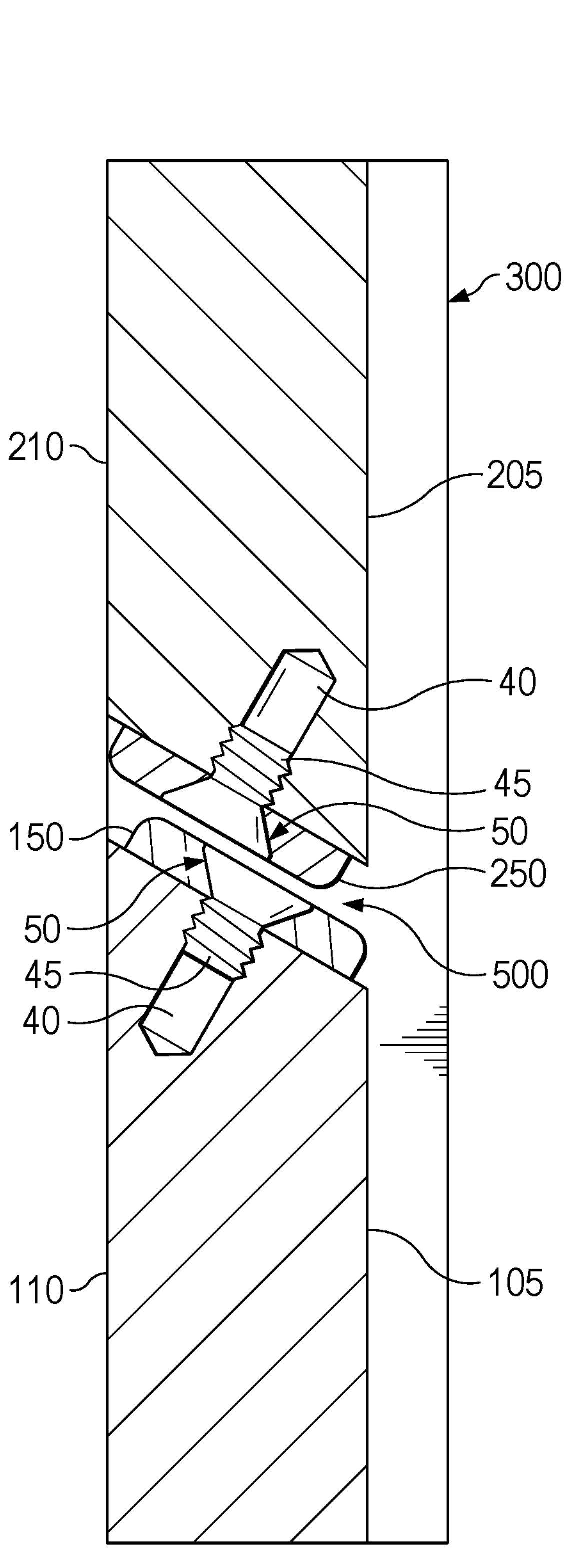
FIG. 4 is a cross-sectional, side view of the trim cutting jig assembly of FIG. 1.
Figure 5:
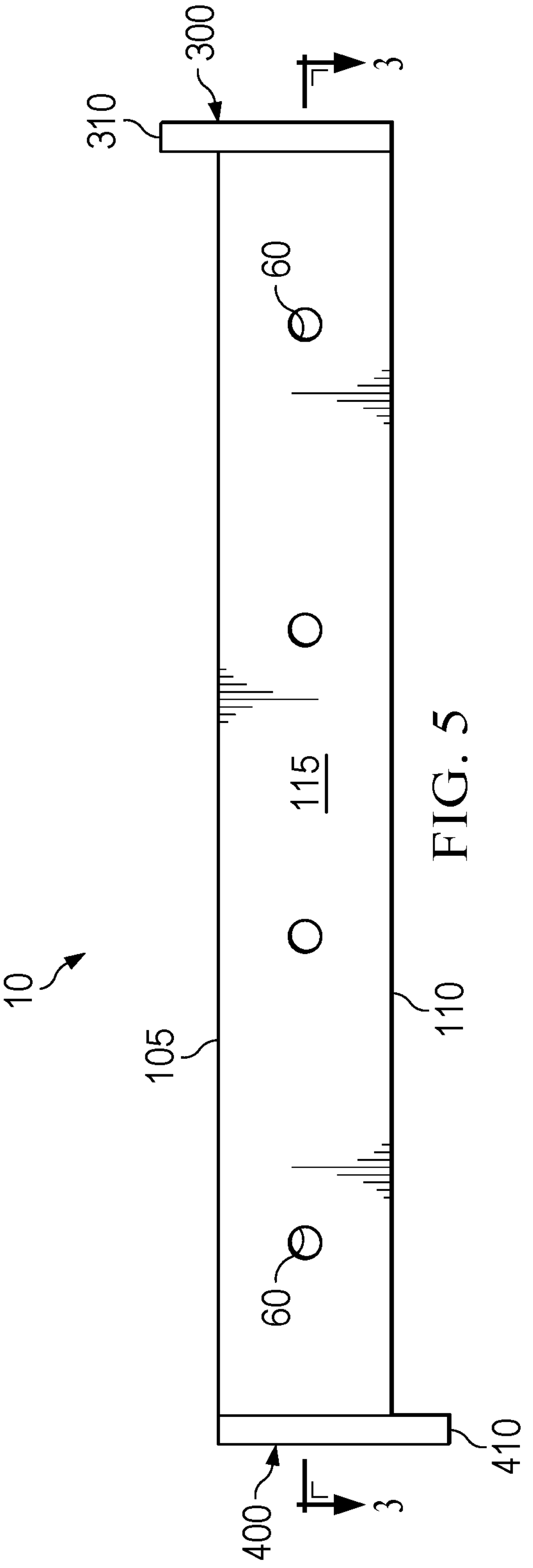
FIG. 5 is a front view of the trim cutting jig assembly of FIG. 1.

FIG. 1 provides a first perspective view of an example implementation of the disclosed trim cutting jig assembly; FIG. 2 provides a second perspective view of the trim cutting jig assembly of FIG. 1; FIG. 3 is a cross-sectional, top down view of the trim cutting jig assembly of FIG. 1; FIG. 4 is a cross-section, side view of the trim cutting jig assembly of FIG. 1; and FIG. 5 is a front view of the trim cutting jig assembly of FIG. 1.

With specific reference to FIGS. 1-5, trim cutting jig assembly 10 includes first jig member 100 and second jig member 200. First jig member 100 includes first contact surface 105, second contact surface 110, outward facing edge 115, inward facing edge 120, and side edges 125, 130. Second jig member 200 includes first contact surface 205, second contact surface 210, outward facing edge 215, inward facing edge 220, and side edges 225, 230. A plurality of apertures 20 having inserts 25 are formed in side edges 125, 225 and 130, 230 for receiving screws 30 or other attachment devices. Screws 30 attach first alignment rail 300 to side edges 125, 225 and second alignment rail 400 to side edges 130, 230. First alignment rail 300 and second alignment rail 400 affix first jig member 100 and second jig member 200 at a predetermined distance from one another to define through-cut channel 500 having a predetermined angle, which in this example is 30 degrees. In the present exemplary embodiment, screws 30 are recessed within first alignment rail 300 and second alignment rail 400. When fully assembled, (i) first contact surfaces 105, 205 are substantially co-planar; and (ii) second contact surfaces 110, 210 are substantially co-planar. First alignment rail 300 includes edge 310 that extends in a first direction at a predetermined distance above and perpendicular to first contact surfaces 105, 205. Second alignment rail 400 includes edge 410 that extends in a second direction at a predetermined distance above and perpendicular to second contact surfaces 110, 210.

With specific reference to FIGS. 3-4, a plurality of holes 40 having inserts 45 are formed in inward facing edges 120, 220 for receiving screws 50 or other attachment devices that affix first guide 150 to first jig member 100 and second guide 250 to second jig member 200. First guide 150 and second guide 250 extend the full length of inward facing edge 120 and inward facing edge 220, respectively, and are configured to guide a blade of a multi-tool, or similar cutting device, within through-cut channel 500 at a predetermined angle along cut-line 85.

With reference to FIGS. 1-3 and 5, a plurality of storage holes 60 are formed in outward facing edges 115, 215 that hold screws 70 or other attachment devices during nonuse of the trim cutting jig assembly 10. A plurality of mounting holes 80 are coaxially formed in first contact surfaces 105, 205 and second contact surfaces 110, 210 for receiving screws 70 when mounting the fully assembled trim cutting jig assembly 10 (see FIGS. 1-2, receiving screws 70 in dashed/broken lines).

Figure 6A:
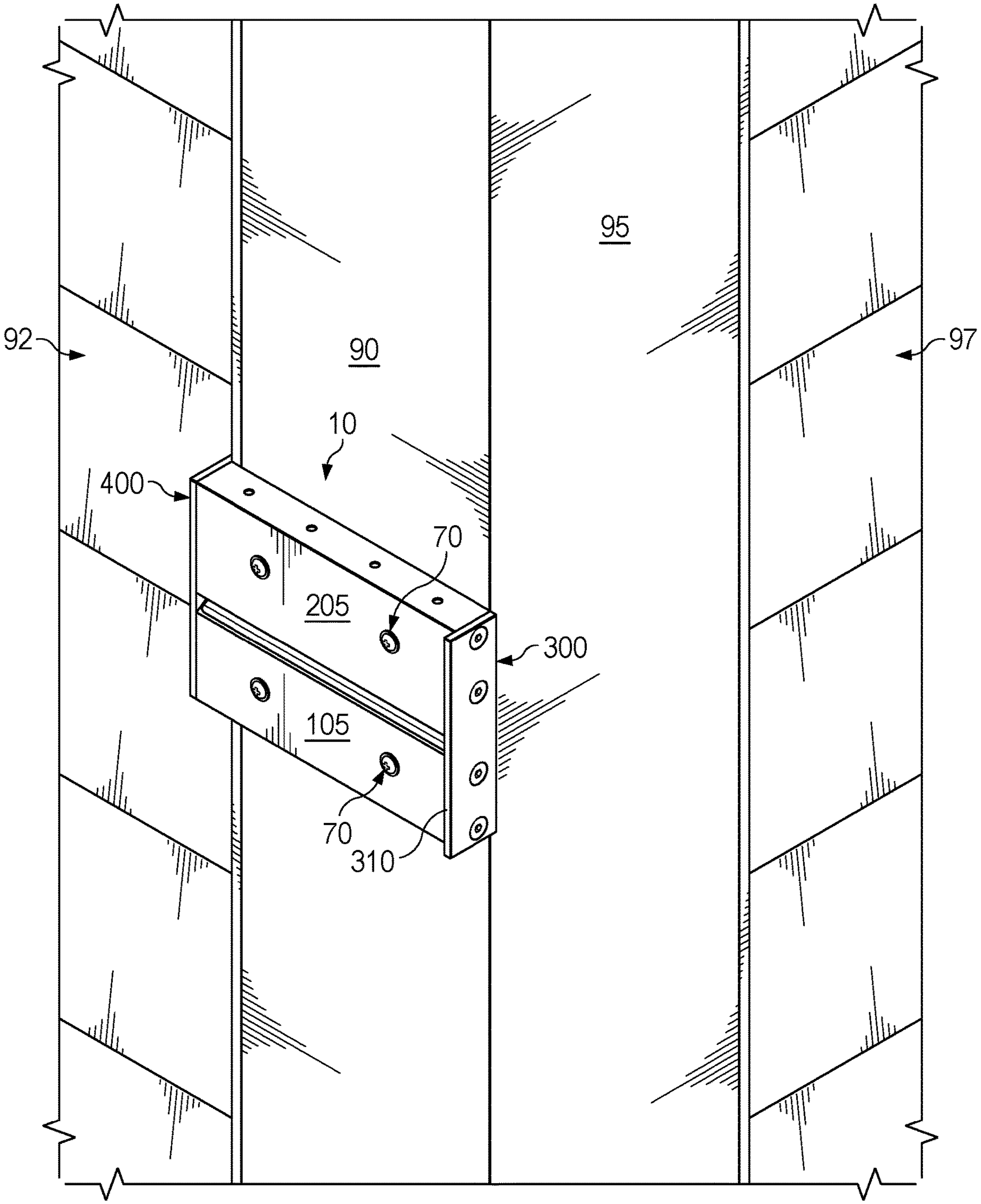
FIG. 6A depicts the trim cutting jig assembly of FIG. 1 mounted to an exemplary trim board on an existing structure or substrate.
Figure 6B:
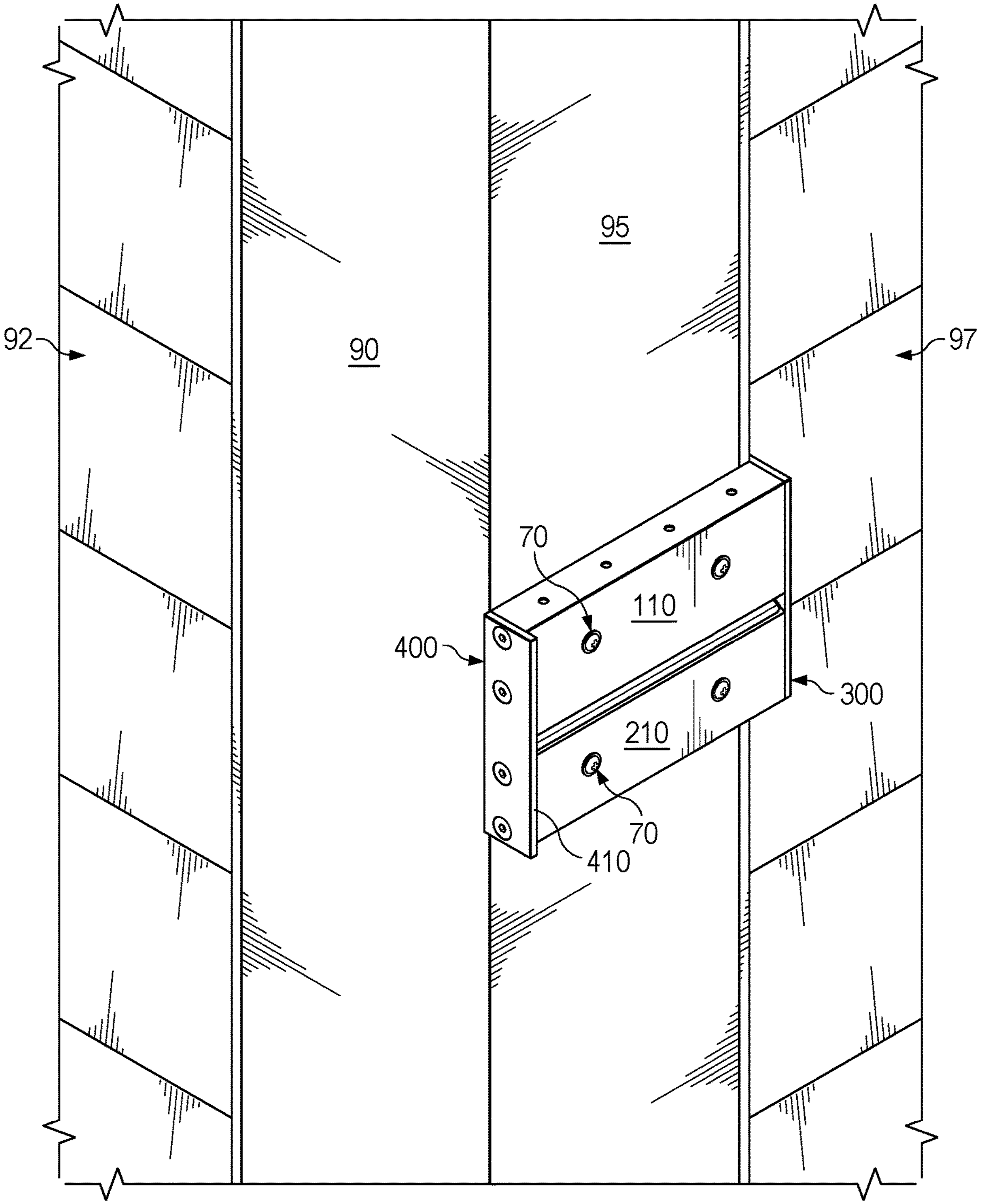
FIG. 6B depicts the trim cutting jig assembly of FIG. 2 mounted to an exemplary trim board on an existing structure or substrate.

FIG. 6A depicts the disclosed trim cutting jig assembly 10 mounted to an exemplary trim board on an existing structure or substrate; and FIG. 6B depicts the disclosed trim cutting jig assembly 10 reversibly mounted to another exemplary trim board on an existing structure or substrate. In FIG. 6A, screws 70 are fastened within mounting holes 80 to trim board 90, thereby affixing trim cutting jig assembly 10 to a portion of trim board 90 to be removed. In this non-limiting example, trim cutting jig assembly 10 is fastened to trim board 90 such that (i) second contact surfaces 110, 210 are flush with the surface of trim board 90; and (ii) through-cut channel 500 is configured at an upward 30 degree cutting angle relative to trim board 90. Edge 310 of first alignment rail 300 extends away from trim board 90 to prevent contact with adjacent trim board 95 during cutting; and recessed screws 30 in second alignment rail 400 permit second alignment rail 400 to fit between trim board 90 and siding 92 without damaging siding 92. Once trim cutting jig assembly 10 is securely mounted to trim board 90, through-cut channel 500 receives the blade of a cutting device to form a consistent cut along the portion of trim board 90 to be removed. Screws 70 are then removed from mounting holes 80 so that the portion of trim board 90 can be completely removed.

In FIG. 6B, trim cutting jig assembly 10 is reversed and attached to trim board 95 such that: (i) first contact surfaces 105, 205 are flush with the surface of trim board 95; (ii) through-cut channel 500 is maintained at an upward 30 degree cutting angle relative to trim board 95; (iii) edge 410 of second alignment rail 400 extends away from trim board 95 to prevent contact with adjacent trim board 90 during cutting; (iv) recessed screws 30 in first alignment rail 300 permit first alignment rail 300 to fit between trim board 95 and siding 97 without damaging siding 97. The reversibility of trim cutting jig assembly 10 creates a consistent 30 degree cut upwards towards the substrate to channel water away from the cut and mitigate water intrusion.

In non-limiting examples, the inserts used with the disclosed trim cutting jig assembly are 18-8 stainless steel helical inserts, 8-32 right-hand thread, and 0.164" long; and the screws used with the disclosed trim cutting jig assembly are zinc-plated alloy steel hex drive flat head screw having 8-32 thread size, and 0.25" long.

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differ from or contradict this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about", if or when used throughout this specification describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed technology. Various functions and elements described herein may be partitioned differently from those shown without departing from the scope of the disclosed technology. Generic principles defined herein may be applied to other implementations. Different numbers of a given module or unit may be employed, a different type or types of a given module or unit may be employed, a given module or unit may be added, or a given module or unit may be omitted.

Regarding this disclosure, the term "a plurality of" refers to two or more than two. Unless otherwise clearly defined, orientation or positional relations indicated by terms such as "upper" and "lower" are based on the orientation or positional relations as shown in the FIGS., only for facilitating description of the disclosed technology and simplifying the description, rather than indicating or implying that the referred devices or elements must be in a particular orientation or constructed or operated in the particular orientation, and therefore they should not be construed as limiting the disclosed technology. The terms "connected", "mounted", "fixed", etc. should be understood in a broad sense. For example, "connected" may be a fixed connection, a detachable connection, or an integral connection; a direct connection, or an indirect connection through an intermediate medium. For an ordinary skilled in the art, the specific meaning of the above terms in the disclosed technology may be understood according to specific circumstances.

It should be appreciated that all combinations of the foregoing concepts and additional concepts discussed in greater detail herein (provided such concepts are not mutually inconsistent) are contemplated as being part of the disclosed technology. In particular, all combinations of claimed subject matter appearing at the end of this disclosure are contemplated as being part of the technology disclosed herein. While the disclosed technology has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed technology in its broader aspects is not limited to any of the specific details, representative devices and methods, and/or illustrative examples shown and described. Accordingly, departures may be made from such details without departing from the spirit or scope of the general inventive concept.

What is claimed:

1. A jig assembly, comprising:

(a) a first guide coupled to a first jig member;

(b) a second guide coupled to a second jig member, wherein the first guide and the second guide are configured to define a channel, wherein the first jig member and the second jig member are configured to define a first contact surface opposite a second contact surface, and wherein the first contact surface and the second contact surface each engage a portion of a trim board affixed to a substrate;

(c) a first alignment rail extending a predetermined distance above and perpendicular to the first contact surface; and (d) a second alignment rail extending a predetermined distance above and perpendicular to the second contact surface.

2. The jig assembly of claim 1, wherein the channel is a through-cut channel adapted to receive the blade of a cutting device.

3. The jig assembly of claim 1, wherein the first and second guides define a channel having a predetermined cutting angle.

4. The jig assembly of claim 3, wherein the predetermined cutting angle is oriented upward at 30 degrees.

5. The jig assembly of claim 3, wherein the jig assembly is reversible such that the first contact surface and the second contact surface can each engage a portion of a trim board affixed to a substrate; and the predetermined cutting angle of the channel is maintained upward at 30 degrees.

6. The jig assembly of claim 5, wherein the jig assembly is operative to remove and replace the portion of a trim board while the trim board remains affixed to the substrate.

7. The jig assembly of claim 1, wherein the first alignment rail and the second alignment rail each include a plurality of recessed attachment devices that couple the first alignment rail and the second alignment rail to the first jig member and the second jig member respectively.

8. The jig assembly of claim 1, further comprising a plurality of mounting holes formed in the first and second contact surfaces, wherein each mounting hole in the plurality of mounting holes is adapted to receive a mounting screw for attaching the jig assembly to a surface.

9. A reversible jig assembly for removing and replacing a portion of a trim board affixed to a substrate, comprising:

(a) a first guide coupled to a first jig member;

(b) a second guide coupled to a second jig member, wherein the first guide and the second guide are configured to define a through-cut channel that receives a blade, wherein the first jig member and the second jig member are configured to define a first contact surface opposite a second contact surface, and wherein the first contact surface and the second contact surface each engage a portion of a trim board affixed to a substrate;

(c) a first alignment rail extending a predetermined distance above and perpendicular to the first contact surface; and (d) a second alignment rail extending a predetermined distance above and perpendicular the second contact surface.

10. The jig assembly of claim 9, wherein the first and second guides define a through-cut channel having a predetermined cutting angle.

11. The jig assembly of claim 10, wherein the predetermined cutting angle is oriented upward at 30 degrees relative to the trim board, and wherein the predetermined cutting angle of the through-cut channel is maintained upward at 30 degrees when the jig assembly is reversed.

12. The jig assembly of claim 9, wherein the first alignment rail and the second alignment rail each include a plurality of recessed attachment devices that couple the first alignment rail and the second alignment rail to the first jig member and the second jig member respectively.

* * * * *